(12) United States Patent
Goldstein

(10) Patent No.: US 6,568,941 B1
(45) Date of Patent: May 27, 2003

(54) TRAINING AIDS AND METHODS FOR NEEDLE BIOPSY

(76) Inventor: Mark K. Goldstein, 930 NW. 8th Ave., Gainesville, FL (US) 32601

( * ) Notice: Subject to any disclaimer, the term of this patent is extended or adjusted under 35 U.S.C. 154(b) by 0 days.

(21) Appl. No.: 10/273,954

(22) Filed: Oct. 18, 2002

Related U.S. Application Data

(62) Division of application No. 09/900,402, filed on Jul. 9, 2001, now Pat. No. 6,485,308.

(51) Int. Cl.$^7$ .............................................. G09B 23/28
(52) U.S. Cl. ....................................... 434/267; 434/262
(58) Field of Search .............................. 434/262, 267, 434/275; 623/7

(56) References Cited

U.S. PATENT DOCUMENTS 4,493,653 A  *  1/1985 Robbins et al. .............. 434/262

\* cited by examiner

Primary Examiner—Timothy L. Maust
(74) Attorney, Agent, or Firm—Sven W. Hanson

(57) ABSTRACT

A training aid for teaching needle biopsy of the human breast. The inventive methods use breast models having lifelike properties providing accurate tactile sensation during palpation of the breast that enable a trainee to learn to locate modeled internal lesions and similar tissues in the breast. These same properties allow learning of tactile sensations indicating relative position and motion of biopsy needles during biopsy needling procedures. To facilitate tactile learning, the breast model includes an opaque skin that blocks the trainee view of a breast cavity containing modeled lesions, ensuring that needling procedures are performed based solely on "feel". The present invention also includes alternative training methods using a second breast model that is sufficiently transparent to allow viewing of modeled lesions from any relative position. The present invention includes training systems incorporating breast models and viewing stands and methods of training using these aids.

8 Claims, 3 Drawing Sheets

TRAINING AIDS AND METHODS FOR NEEDLE BIOPSY

RELATED DOCUMENTS

The present application claims priority from, and is a divisional application of U.S. patent application Ser. No. 09/900,402 filed Jul. 9, 2001, now U.S. Pat. No. 6,485,308.

BACKGROUND OF THE INVENTION

The present invention pertains to models and devices used to train manual needle biopsy procedures. In particular, the present invention pertains to manual needle biopsy training methods and systems that use models of the human female breast. Breast cancer is among the most common malignant forms of cancer and is a leading cause of death from cancer among women in the United States. Various methods have evolved for breast examination and detection of early stage cancerous growths. Manual breast examination has been found to be a highly effective method of early breast cancer detection. Tactually accurate breast models have been developed to train the palpation techniques used in effective manual examination. Training success in breast palpation and self-examination is dependent in part on providing a realistic breast model that produces accurate tactile responses in the user. For this reason, breast models have been designed with lifelike texture and tactile properties.

Lumps or other breast tissue abnormalities revealed by clinical examination or other physical examination methods may be indicators of any of a variety of conditions, some of which are benign and relatively inconsequential to health. A first step in investigating tissue abnormalities is most often a needle biopsy. In needle biopsy, the breast is typically first palpated to locate the subject lump. A needle attached to a syringe or a similar suction device is then passed through the breast until penetrating the lump. A portion of the suspected tissue is then aspirated and withdrawn for testing. Successful needle biopsy requires training to assure quick and accurate location of the lump and certain penetration of the lump by the aspiration needle. Lengthy probing potentially exposes the patient to trauma and inaccuracy may result in false negative test results for failure to aspirate the correct tissue. Traditionally, needle biopsy techniques are taught in medical schools using actual patients. This situation is problematic in view of the majority of patients' unwillingness to cooperate in such training procedures. Consequently, breast models similar to those used for breast self-examination have been developed for training needle biopsy. One such device is provided in U.S. Pat. No. 5,803,746 to Barrie et al.

Because in the clinical situation, the target of a free-hand needle biopsy is an invisible lesion that must be located by palpation, training devices preferably similarly prevent the trainee from viewing the target lump. However, this inevitably results in an inefficient trial-and-error methodology in practice. The Barrie device suffers from this weakness. Breast examination can be improved if a trained instructor is able to view the trainee's needle and the target within the breast model to provide instant comment and corrective feedback on a trainee's technique. However, prior breast models do not provide a means that enables an instructor to view a trainee's technique while blocking trainee visual access to the model. The same elements obscuring the trainee's vision also obscure the instructor's. Various imaging systems for visualizing biopsy needles and phantom lumps within breast models based on such methods as ultrasound and X-ray have been suggested. Examples of these are provided in U.S. Pat. No. 4,493,653 to Robbins et al. and U.S. Pat. No. 5,273,435 to Jacobson. However, the construction of the breast models in these systems preclude proper palpation technique and are very cumbersome. In addition, the viewing operations of these prior methods interfere with training activities. Effective palpation in needle biopsy training demands the same lifelike properties in a training model designed to teach the skill of manual breast examination. However, existing self-examination breast models suffer from the same defect as the Barrie devices. For example, U.S. Pat. No. 4,134,218, to Adams et al. and U.S. 4,867,686 to Goldstein disclose models of a human female breast having lifelike texture and tactile response to palpation. These references also teach various methods of palpation training including providing transparent breast elements to allow the trainee to observe the subject lumps after palpation to verify technique. However, neither Adams nor Goldstein provide a device or method enabling a secondary viewer such as an instructor to view a trainee's palpation technique at the time the trainee is palpating the model.

What is needed is a lifelike breast model including lumps simulating various anomalous tissues and providing an optical path that enables a second viewer such as an instructor to observe a trainee's needling technique while enabling obscuring the trainee's view of the target tissue.

SUMMARY OF THE INVENTION

The present invention is a training aid for teaching needle biopsy of the human breast. It provides breast models having lifelike properties providing accurate tactile sensation during palpation of the breast that enable a trainee to learn to locate internal lesions and similar anomalous tissues in the breast. These same properties also allow trainee learning of tactile sensations that indicate relative position and motion of biopsy needles during biopsy needling procedures. To facilitate tactile learning, one breast model of the invention includes an opaque skin that blocks the trainee view of a breast cavity containing simulated lesions, ensuring that needling procedures are performed based solely on "feel". Such "blinded" breast models are supported in a position to allow access to the surfaces normally palpated and penetrated during clinical needling procedures, while allowing viewing of the breast internal elements by a second party such as an instructor. In one embodiment, the breast model is supported on a transparent surface of a portable stand. The stand includes optical elements creating a viewing path from the breast cavity to a second location separate from the trainee. In this way, a trainee may practice needling based solely on simulated tactile information while an instructor observes internal events, enabling real-time comment and instruction. Because viewing is accomplished by optical light pathways and not penetrating electromagnetic radiation (x-ray) or other penetrating energy (ultrasound), potential interference of trainee activities by the viewing operations is eliminated. The models and stands and methods provided allow for palpation and needling of the entire breast model surface and volume without moving the model and while providing continuous viewing by second persons. The present invention includes training systems incorporating breast models and viewing stands and methods of training incorporating these structural aids.

The present invention also includes training methods using an alternative breast model that is sufficiently transparent to allow direct viewing of modeled lesions from any relative position. In preferred training methods of the invention, this model is used to provide "error-free" training in which a trainee learns proper tactile indicators of accurate needling techniques. This training mode may be used independent of, or more preferably, preliminary to, training with "blinded" models. The present invention includes training systems including blinded and transparent models and methods of training incorporating both. The present devices and methods of presenting and viewing breast models are also used in methods of teaching examination of breast tissues by palpation without needling.

Particular benefits of the invention include small portable and unpowered embodiments that are easily and cheaply employed in a variety of circumstances. Other advantages of the invention as described in the following drawings, detailed description, and claims will apparent to one skilled in the art.

DESCRIPTION OF THE PREFERRED EMBODIMENTS

Figure 1:
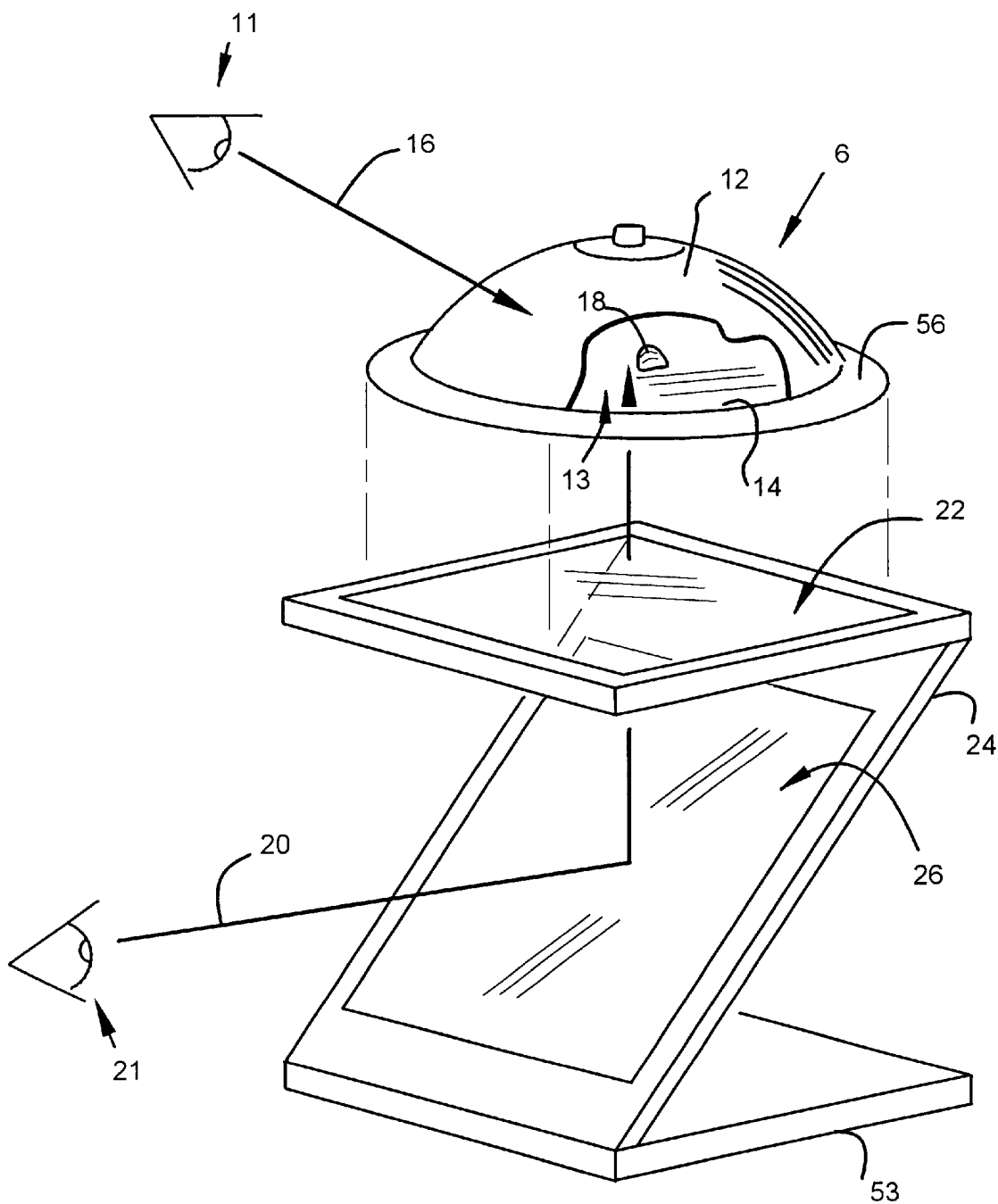
FIG. 1 depicts one embodiment of the present including a "blinded" breast model supported on a portable stand incorporating a reflective surface to establish a viewing path from a cavity within the breast model to a location separated from a trainee location.

Proper biopsy needling training requires that a trainee gain the ability to distinguish and locate specific target lesions by tactile means alone and the ability to guide a biopsy needle through breast tissue to penetrate these target tissues. Much of the required skills in breast biopsy needling are the same as those for breast self-examination. However, in addition, tactile sensations of position and motion of the fine needle biopsy needle and needle tip relative to the target tissue must also be learned. Herein the term "fine needle" and "fine needle biopsy" refers to devices and procedures in which relatively small gauge aspirating needles are used to collect small quantities of tissue as is typical in breast tissue biopsy.

To prepare a trainee for performing a needle biopsy on a human, where the targeted lesions are always obscured, it is desirable to also train with "blinded" models: those which obscure the trainee's view of the model interior. It is important that the person being trained not be allowed to visually inspect the interior of the model prior to the first needling attempt in blinded training. Without prior visual inspection, the person being trained must rely solely upon tactile sensation that replicates the procedure with human patients. Training with blinded breast models consists first of palpating a breast model to locate a target lesion within the model. The trainee's fingers continue to palpate the breast model to isolate the target while an aspiration needle is pushed through the model and toward the target. The fingers palpating the model are able to help locate and guide the needle tip as it moves through the model and into the target. The lifelike characteristics of the breast model provide tactile training of these events and allow the trainee to accumulate sensory knowledge of successful technique.

An aspect of the present invention to increase training effectiveness is to give the trainee instructional feedback while practicing blinded needling to identify successful and unsuccessful technique. Satisfying this requirement is impossible with completely opaque models, as the need for obscuring breast model internal events from the trainee during needling practice is incompatible with the instructional requirement of obtaining and relating such feedback information. In the above referenced Goldstein patent, a similar problem with self-examination training is resolved by providing the breast model with an obscured skin and a transparent backing. In Goldstein, after attempted palpation, the trainee reorients the model to allow trainee viewing through the transparent backing. However, this mode of operation is not applicable to training needling technique for a variety of reasons. First, any movement of the breast model easily disrupts the relative positions and orientation of the needle and target. The breast model should be held stationary during needling training functions. Second, real-time instructional feedback during movement of the needle through the breast model is not possible using the Goldstein mode.

The present invention resolves this problem with a training method in which a breast model with a transparent internal cavity obscures the trainee view but provides a second viewing path from model internal cavity to a second party, such as an instructor, located away from the trainee. This is accomplished without moving the model. FIG. 1 depicts an embodiment of the invention providing these features. A portion of a blinded breast model 6 is shown cut away to reveal internal elements. The model 6 has an opaque outer skin 12 and a transparent backing 14 and cavity 13. The model 6 is positioned in use such that the viewing path 16 from the trainee positioned at a first relative location 11 to a needling target 18 in the model cavity 13 is blocked by the skin. A second distinct viewing path 20 is provided to a second relative location 21. In use, the model 6 is placed on a transparent restraining surface 22 of training stand 24. The training stand 24 includes a reflective surface 26 configured and oriented to reflect the image of the breast internal cavity 13 and events therein to the second location 21. The viewing paths are oriented such that the first location 11 and second location 21 are sufficiently separated that a trainee at the first location 11 is unable to view the image provided by the second viewing path 20. For example, the breast model 6 may be positioned at on a stand at standard desk height and a trainee instructed to work in a standing position such that the trainee's eyes will naturally be relatively above the breast model 6 and blocked by the opaque skin 12. The second viewing path 20 then is oriented at an angle from the first location 11 to eliminate the opportunity of the trainee viewing the image projected along the second viewing path 20. An instructor or other second party positioned at the second location 21 is able to view the internal cavity of the breast model, as well as any events therein, while the trainee's view is obscured. During this blinded model mode of training of the present invention, an instructor, or other person, observes the needling observation as it occurs and provides real-time feedback to the trainee regarding the ongoing needling procedure. In this way, a trainee may attempt a palpation or needling movement while blinded from the movements and immediately receive feedback comments regarding the consequences or success of that event. Any trainee corrective efforts are still blinded.

Figure 2:
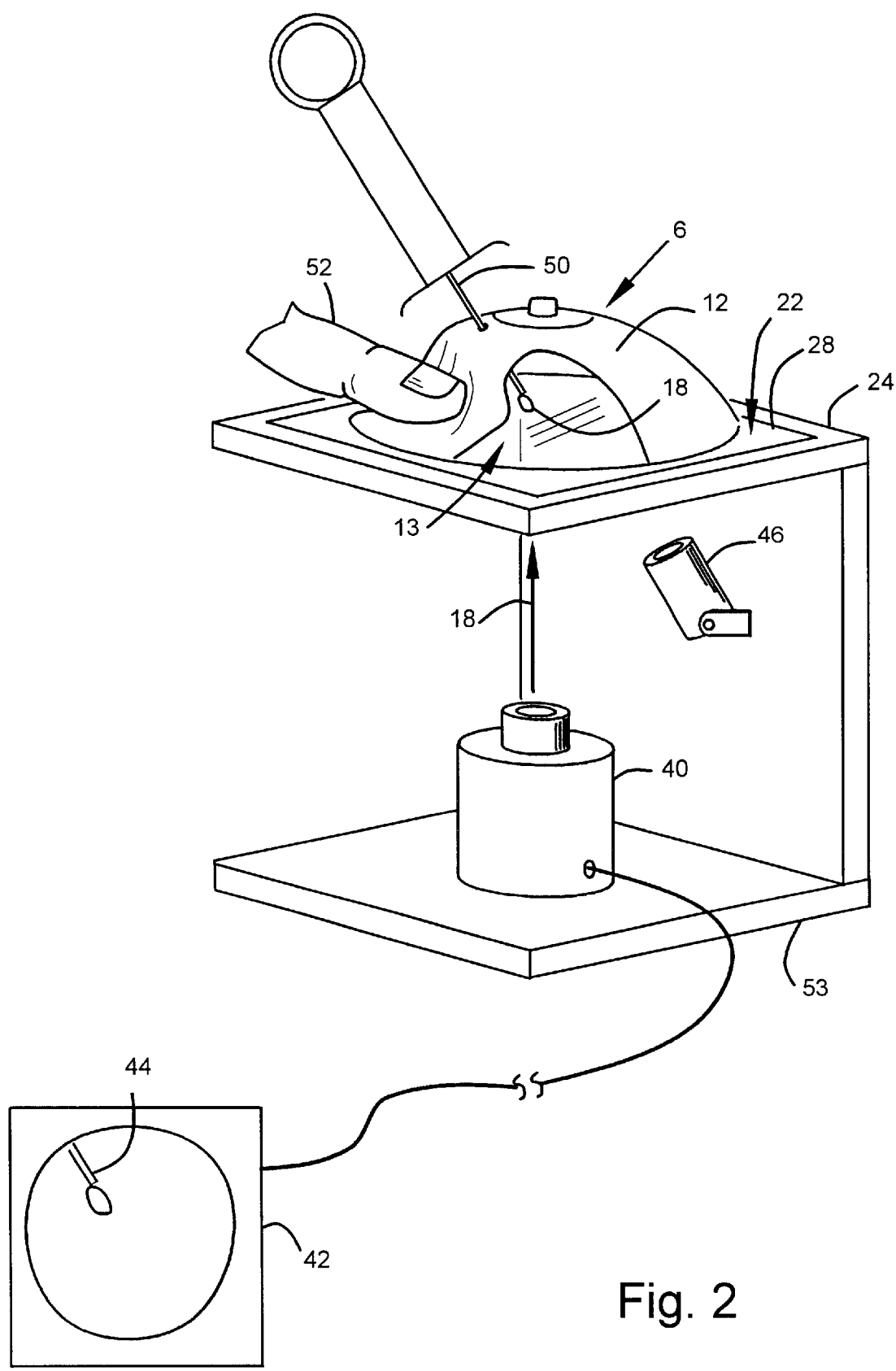
FIG. 2 depicts a breast model in needling training methods according to the present invention. A video imaging system transmits an image of the breast model cavity to a distant location.

In an alternative embodiment shown in FIG. 2, the viewing path to a second location is formed in part by an image transmitting system such as a video-capable camera 40 directed through a transparent glass top 28 of a stand 24 which supports a blinded breast model 6. The camera 40 is functionally connected to a distant monitor 42 on which is displayed an image 44 received by the camera 40. In this manner the view of the model cavity and events therein may be transmitted to any remote location. An advantage of this embodiment is the ease with which additional persons may view the training events. The monitor may be placed to allow several people to observe the received image. This may be used to provide an additional training aspect by allowing other additional trainees to view procedures as they occur. A light source 46 is provided and positioned to illuminate the breast model internal cavity 13 to enhance viewing. In the figure, the model is cutaway to show an aspiration needle 50 is shown as in use penetrating the model skin 12 and directed to a target 18 while the breast model 6 is palpated by a trainee's finger 52.

One benefit of the embodiments exemplified in FIGS. 1 and 2 are their small size and simplicity which encourage their availability and use. The training stand 24 must support the transparent restraining surface 22 relative to the elements of the secondary viewing path, whether a reflective surface or a video camera. The transparent restraining surface 22 may be provided by a glass top 28 as shown or other substantially transparent supporting means such as transparent plastic. The restraining surface 22 must be of sufficient size and rigidity to supporting a breast model during needling operation. A stand 24 having restraining surface width dimensions of six inches (15 cm) is sufficient to support a typical breast model. The height of the stand is dependent only on the construction and elements of the secondary viewing path, and may be as small as twelve inches (30 cm) or less when used with compact optical elements such as small video cameras or a fixed mirror. The stand includes a base 53 for retaining the stand on a horizontal surface such as a tabletop. The base may incorporate legs or equivalent structures. A training stand as just described is small enough to be easily stored, transported and handled by one person in a variety of situations. In particular, such a system and stand is of a size to be contained in luggage of a size meeting the "carry-on" standards of commercial airlines, providing ease of use in a variety of locations. Using a secondary viewing path incorporating a physical mirror, the stand is portable and may be used in locations without power sources. Alternative reflective surfaces consisting of a mirror having at least one axis of rotation to allow for manipulation of the secondary viewing path are also contemplated. Design particulars of this feature are generally known to those skilled in the art. In general, the stand 24 should allow easy access by a trainee to a breast model positioned on the stand. Because the entire volume of the breast model may need be palpated, and from various angles, it is important that the stand, and all other structures, be distant from the sides of the stand and breast model so positioned.

Figure 3:
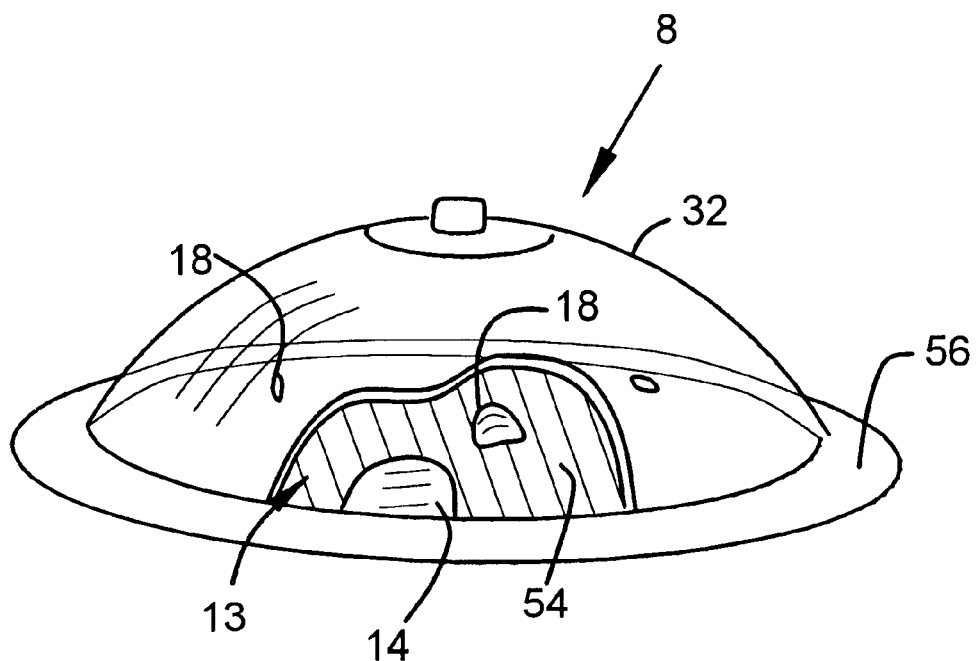
FIG. 3 depicts a transparent breast model used in "error-free" training according to the present invention.
Figure 4:
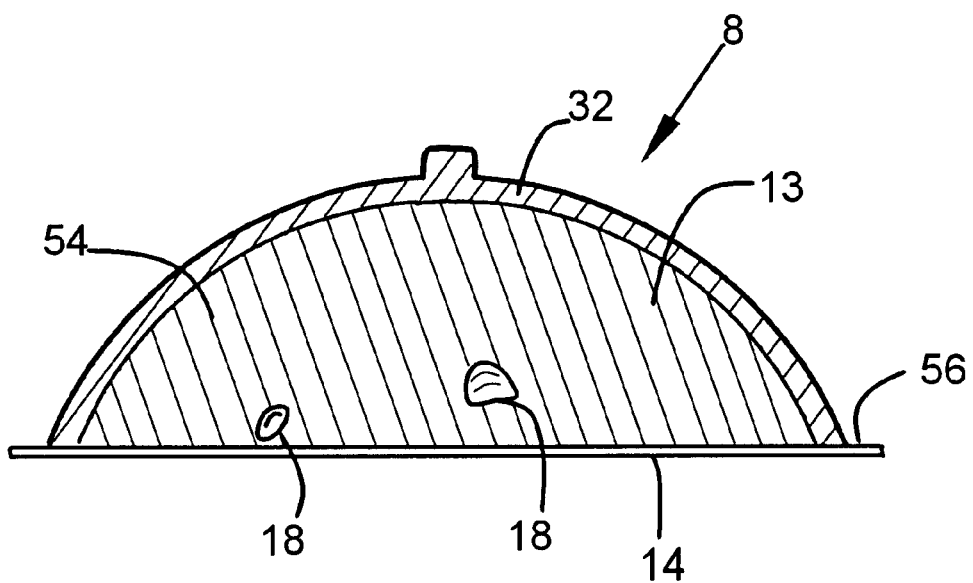
FIG. 4 is a cross section view of a breast model according to the present invention.

One mode of the present invention introduces "error free" practice training in which a trainee is initially allowed to practice in a non-blinded mode before proceeding to the blinded mode. This is accomplished by providing a breast model that is fully transparent to the trainee. One embodiment of this transparent model 8 is shown in FIGS. 3 and 4. The fully transparent breast model 8 includes a transparent outer skin 32. The model 8 also has a transparent backing 14, internal cavity 13 and targets 18 in the same fashion as the blinded model 6. The objective of this mode and model is to provide the trainee a clear viewing path to the model targets. In this mode of training the trainee practices needle insertion and penetration techniques while being able to watch, and feel, the needle position and motion through the transparent breast model 8 and into the targets 18. At the same time, the trainee is able to relate the tactile feedback of the trainee's palpations with the resulting effect on the needle motion and target. This mode allows the trainee to experience successful "error-free" needling and build a base of knowledge of the proper feel of successful needle manipulation. So called "error-free" training is distinguished here from training using "blinded" models in which the needle within the model and the target is obscured from the trainee's vision. Error-free training can reduce the training inefficiency possible with trial-and-error blinded training. Preferably trainees are provided error-free training prior to training with blinded models. However, benefits are gained independently with each model and mode of training.

While each of the present breast models and the training stands provide independent benefits to fine needle aspiration training, they are more effectively used as an integrated system. The present invention includes systems for training fine needle biopsies of the human breast. One embodiment of such systems includes both 1) a blinded breast model having an obscuring skin and a transparent backing and internal cavity simulated target lesions, 2) a viewing stand providing a breast model supporting means and secondary viewing path. A more preferred system providing both error-free and blinded modes of training includes all of 1) a fully transparent breast model including target lesions, 2) a blinded breast model having an obscuring skin and a transparent backing and internal cavity and targets and 3) a viewing stand providing a breast model supporting means and secondary viewing path. A preferred training method using this preferred system comprises the steps of 1) error-free training in which trainees attempt needling techniques with a fully transparent breast model having various sized and positioned lumps, followed by 2) blinded training with a blinded breast model having various lumps that differ from those in the error-free model.

To properly instruct needling techniques for needle aspiration of breast tissues, both transparent models and blinded models should be substantially lifelike. The models should provide lifelike shape and features and correct tactile response so that needling techniques will be learned through practice with realistic tactile stimuli. The models should provide accurate tactile distinction of internal elements to allow the user to train tactile identification of subject anomalous tissues. It is preferred that models be available in several sizes and varying degrees of firmness to enable training for a representative cross-section of the female population. Except for the obscuring or transparent nature of their respective skins, the two models discussed above may be constructed in like fashion. Except where specifically indicated otherwise, the following construction details apply equally to blinded and fully transparent models. The models 6, 8 are substantially hemispherical in shape. The skin is an elastomeric membrane simulating human skin. In the error-free breast model 8 the skin 32 is transparent, while the elastomeric membrane forming the skin 12 of the blinded model 6 (FIGS. 1, 2) includes an opaquing material. The hemisphere of skin 12 is enclosed by backing 14 formed of a like elastomeric membrane. Both the skin 12 and backing 14 may be made of any of a variety of materials providing skin-simulating properties including, but not limited to, polyvinyl chloride, polyurethane or elastomeric silicone resin polymers. Suitable elastomeric silicone resin polymers are commercially available from General Electric Company and Dow Corning Corporation, among others. A skin 12 having a hardness less than durometer 20 ( Shore 00- ASTM 2240), and more preferably in the range of durometer 10 to 20, provides the desired lifelike properties. The material used to form the skin 12 of the transparent model 8 and the backing 14 must be transparent and should provide good optical clarity to allow for visual inspection of the internal cavity of the models. The material(s) used to form the backing 14 and the skin 12, 32 should also be of a sufficient thickness and strength to withstand the repeated pressures exerted on the model during palpation and repeated penetrations by aspiration needles, although the skin should not be so thick as to detract from the realistic feeling thereof A skin thickness in the range of 0.0025 to 0.005 inches (0.0063 to 0.013 cm) has been found acceptable. Due to the methods of construction, skin thickness is difficult to control and will vary over the area of a single model. A flange portion 56 of the backing extends outward from the skin and is not critical but provided for ease of handling and to help retain the shape of the model. Between the skin 12,32 and backing 14 the internal cavity 13 is filled with a transparent simulated adipose tissue medium 54 (not distinctly depicted in FIGS. 1 and 2 for clarity). The targets 18 are configured to simulate one or more tumors, cysts, or other subject tissues and are suspended within the medium 54. Simulation is principally effected by providing material having density tactilely differentiating the lumps from the surrounding medium. The targets are preferably opaque in all models. It will be appreciated by one skilled in the medical arts that real breast tumors are located in various locations in the human female breast and are prone to feel as though they are relatively fixed in position or, alternatively, free floating. Accordingly, the feel of such tumors and the difficulty in locating and such tumors by palpation and directing a needle to them varies. For this reason, it is desirable to locate the targets 18 in varying locations in the models, and variously in different models, according to the present invention. Although the target constructions specified herein do not provide for actual aspiration into an aspirating needle, other targets capable of aspiration may be incorporated to add a training element. Texture inducing elements such as silica may be added to the media to enhance a realistic feel. General methods of constructing the above breast model features are provided in U.S. Pat. No. 4,134,218, to Adams et al. and U.S. Pat. No. 4,867,686 to Goldstein, the disclosures of which are incorporated herein by reference and may be followed except as specified distinctly herein. The medium 54 is formed according to the construction of Goldstein for means simulating adipose tissue. It is not critical to use the particular materials suggested for forming the skin 12, backing 14, medium 54 and target 18. Rather, the models 6, 8 should have the complex feel of adipose tissue within a human female breast and the targets 18 should accurately simulate the feel of real tumors.

Because needle biopsies introduce the element of penetration of the breast and breast tissues, effective models for biopsy training have additional requirements over self examination models. In order to provide lifelike feel, breast models are often filled with materials having almost fluid-like properties, i.e., the simulated adipose tissue medium. Penetration of the breast model skin may potentially allow these materials to leak out through the penetration when the needle is removed. The breast model outer layer or skin must be sufficiently self-sealing with respect to the particular internal materials to prevent leakage. The constructions taught by Goldstein have been found to be acceptably self-sealing with the skin thicknesses specified herein. When a biopsy needle is forced through the epidermis and penetrates the breast tissue in an actual biopsy procedure, the clinician handling the procedure feels the resistive forces of the epidermal wall and breast tissue on the needle and these senses effect the clinician's ability and success in distinguishing and penetrating target tissues. The breast models described herein substantially provide this tactile feedback to a trainee.

The preceding details are provided for example only. Other variations of the claimed inventive concepts will be obvious to those skilled in the art. For example, the preceding discussion expressly discusses "fine needle" techniques and procedures. It will be clear that the same methods are applicable to clinical techniques involving larger bore needles including what is commonly termed "large-core" needles and associated large-core needle biopsy procedures as well as other free-hand needling procedures for biopsy of tissue. Adaptation or incorporation of alternative devices and materials, present and future is also contemplated. The intended scope of the invention is defined by the following claims.

I claim:

1. A method of training examination of tissues within the human breast, comprising:

positioning a lifelike human breast model to allow palpation of a breast model cavity while preventing viewing of the model cavity;

palpating a lump within the cavity, by a trainee, while enabling a second person to observe the cavity.

2. The method of claim 1, and further comprising:

providing information to the trainee regarding viewed events within the breast model.

3. The method of claim 1, and further comprising:

needling of tissues inside the breast model by the trainee while preventing the trainee's viewing the model cavity.

4. The method of claim 3, and further comprising:

needling of tissues inside a second breast model by the trainee while allowing the trainee to observe the inside of the second breast model.

5. A method of training examination of tissues within the human breast, comprising:

palpating a breast model by a trainee, while preventing the trainee from viewing a model cavity; while projecting an image of at least a portion of the cavity to a location separated from the trainee.

6. The method of claim 5, and further comprising:

forming a tactilely accurate opaque breast model;

supporting the model to allow palpation.

7. The method of claim 5, wherein:

the step of projecting an image includes projecting an image onto an electronic monitor.

8. The method of claim 5, further comprising:

palpating a transparent breast model by the trainee.

* * * * *